United States Patent [19]
Goldmeier

[11] Patent Number: 5,261,681
[45] Date of Patent: Nov. 16, 1993

[54] SAFETY PIVOT GUARD FOR A COASTER WAGON

[75] Inventor: Steven Goldmeier, Bethpage, N.Y.

[73] Assignee: Rand International, Inc., Farmingdale, N.Y.

[21] Appl. No.: 846,054

[22] Filed: Mar. 5, 1992

[51] Int. Cl.⁵ .............................................. B62B 3/00
[52] U.S. Cl. .................... 280/87.01; D21/135; 280/47.34; 280/748; 403/23
[58] Field of Search .......... 280/87.01, 87.021, 87.043, 280/47.34, 748, 749; 403/23, 50, 51; D21/134, 135

[56] References Cited

U.S. PATENT DOCUMENTS

| | | | |
|---|---|---|---|
| 1,922,431 | 6/1929 | Geyer | 464/175 |
| 2,780,080 | 8/1953 | Cork | 464/106 |
| 2,976,703 | 9/1959 | Atkinson | 464/117 |
| 3,275,337 | 8/1964 | Lau | 280/47.34 |
| 4,440,372 | 4/1984 | Wisniewski | 403/50 |
| 4,744,575 | 5/1988 | Tonelli | 280/87.01 |
| 4,856,141 | 8/1989 | Sassenberg | 16/250 |
| 4,902,545 | 2/1990 | Ohta et al. | 428/366 |
| 4,930,831 | 6/1990 | Valiga et al. | 280/87.01 |
| 4,967,609 | 11/1990 | Takagi et al. | 403/50 |

*Primary Examiner*—Eric D. Culbreth

[57] ABSTRACT

A safety pivot guard for a pivot connecting a steering handle arm and front undercarriage of a coaster wagon encompasses the pivot to prevent injury caused from direct physical contact with the pivot. The safety pivot guard envelopes the pivot with an expandable, pleated section and is attached at its ends to either the steering handle arm or struts extending in the front undercarriage.

5 Claims, 1 Drawing Sheet

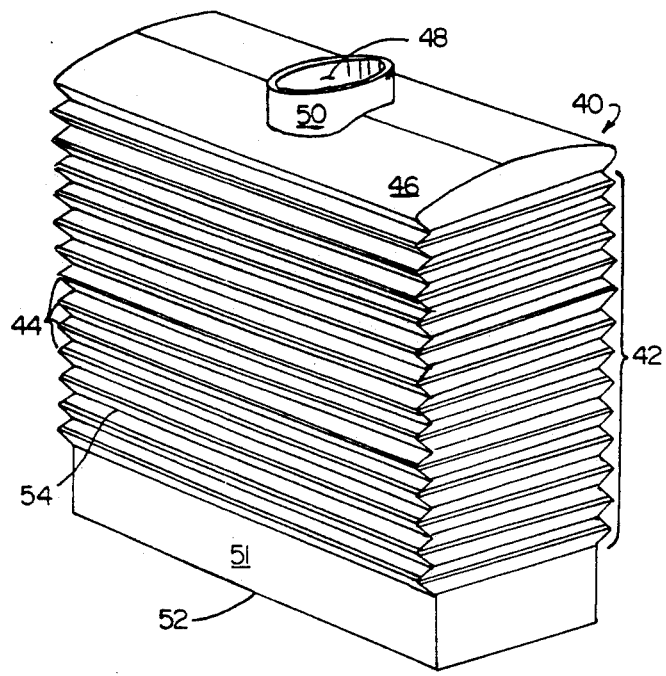
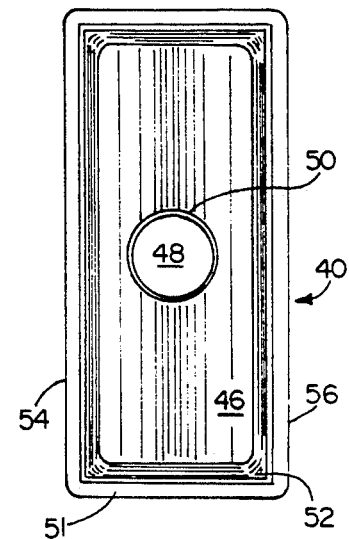
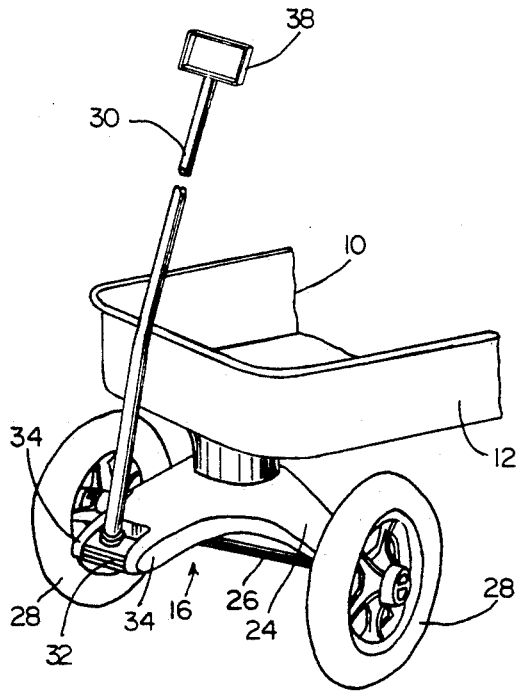
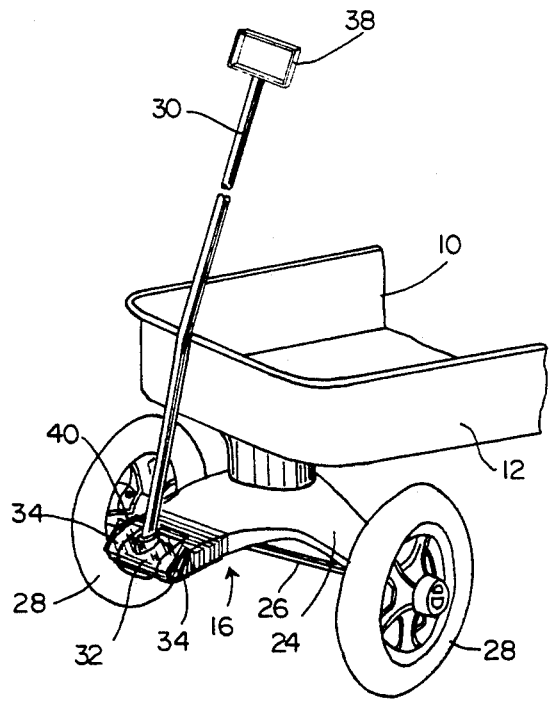
FIG 2
FIG 3
FIG 1
FIG 4

SAFETY PIVOT GUARD FOR A COASTER WAGON

BACKGROUND OF THE INVENTION

1. Technical Field

The present invention pertains to a protective cover for a pivot connecting the pull arm handle of a coaster wagon with the undercarriage of the wagon.

2. Description of the Prior Art

A conventional coaster wagon has a main body section supported on a rear wheel and axle assembly and on a front steering wheel and axle assembly. As is well known, a coaster wagon is steered by manipulation of a handle pivotally mounted at one end of the front steering wheel and axle assembly. A problem arising during the use of such a coaster wagon by small children is that the children's fingers often get pinched or clamped in the handle pivot mechanism. It is therefore desirable to provide the handle pivot mechanism with a guard or safety shield to prevent a child from having direct physical contact with the pivot mechanism.

OBJECTS AND SUMMARY OF THE INVENTION

Accordingly, the primary object of the present invention is to prevent potential injuries from occurring during the use of a coaster wagon by employing a safety pivot guard over a pivot connecting a pull arm handle of a coaster wagon with the undercarriage of the wagon. This object must be achieved without deleteriously effecting the maneuverability of the steering mechanism of the wagon.

It is a further object of the present invention to create a safety pivot guard that is easy to install, and after being installed is maintained in a stable position on a coaster wagon.

The aforesaid objects are achieved by covering the exposed pivot with an expandable, accordion pivot guard to prevent direct contact between a child and the pivot. The pivot guard contains one opening at a rearward end to fit over and frictionally engage the forward strut members of front steering and axle assembly and one opening in the forward end dimensioned to slidably engage the pull arm handle of the coaster wagon. The pivot guard can be placed in position by removing any existing handle from the pull arm and sliding the pivot guard over the steering handle arm through the rearward then forward openings in the pivot guard until the rearward end of the pivot guard frictionally engages the forward strut members.

BRIEF DESCRIPTION OF THE DRAWINGS

The above and still further objects, features and advantages of the present invention will become apparent upon consideration of the following detailed description of the specific embodiment therefore, particularly when taken in conjunction with the accompanying drawings wherein like reference numerals in the various figures are utilized to designate like components, and wherein:

FIG. 1 is a perspective view of a pivot connecting the pull handle arm and the undercarriage of a coaster wagon.

FIG. 2 is a perspective view of the safety pivot guard of the present invention.

FIG. 3 is a bottom view of the safety pivot guard of the present invention.

FIG. 4 is a perspective view of the safety pivot guard in working position over a pivot connecting the pull handle arm and the undercarriage of a wagon.

DESCRIPTION OF THE PREFERRED EMBODIMENT

Referring now to FIG. 1, a front half portion of a conventional coaster wagon 10 having a main body section 12 supported on a front undercarriage in the form of a front steering wheel and axle assembly 16. The front steering wheel and axle assembly 16 includes an inverted generally U-shaped frame member 24 pivotally mounted to the underside of the main body section 12, a transverse axle 26 carried in the frame member 24, wheels 28 at the ends of the axle 26, and a steering mechanism or structure including a steering handle arm 30 pivotally mounted at its rearward end on a pivot 32 mounted onto strut members 34 projecting forwardly from the frame member 24. The steering handle arm 30 has mounted thereon a handle 38.

Referring specifically to the drawings and FIGS. 2 and 3 in particular, a safety pivot guard 40 according to the present invention includes a bellows in the form of an expandable, accordion sleeve section 42, preferably formed from rubber or other elastomeric material, molded to form a bendable plurality of pleats 44 forwardly extending to hood surface 46 containing a handle arm aperture 48 in an arm collar 50. The accordion sleeve section 42 rearwardly extends into a rim collar 51 containing a strut sleeve opening 52. The pleats 44 on the sleeve 42 are disposed in successive abutting fashion.

It should be understood that while the expandable sleeve section 42 of the safety pivot guard 40 has been identified as having pleats 44, this bellows or accordion-like section is regularly sinusoidal or undulating in a longitudinal manner, or corrugated in either parallel raised edges or spiral, thread-like form. While the expandable sleeve section 42 is displayed in the accompanying drawings as being essentially rectangular in structure with pleats extending throughout all four sides, it should be appreciated that alternative forms are herein contemplated. For instance, since the handle arm 30 can only pivot in a forward and rearward direction it is only necessary to employ pleats on the front surface 54 and rear surface 56 of expandable sleeve section 42 to accommodate such movement. The main body of the safety pivot guard 40 can be cylindrical having either a circular or ovular cross-section or any other shape that accommodates the pivoting capability of the pivot structure that it covers when mounted.

The forward surface of the safety pivot guard 40 contains the hood surface 46 forming a forward cover on and connecting to the forward portion the expandable sleeve section 42 with the arm collar 50 containing the handle arm aperture 48. The handle arm aperture 48 is shown as a round or circular opening to ensure the forward positional stabilization of the safety pivot guard 40 when the safety pivot guard 40 is mounted over the handle arm 30 pivot mechanism and a rod-like wagon handle arm is extended through the handle arm aperture 48. The handle arm aperture 48 can suitably dimensioned to permit any shaped handle arm to extent through the handle arm aperture 48 in a slidable fashion. The handle arm aperture 48 is preferably configured to match the configuration of the cross-section of the wagon handle arm 30 to provide a slidable engagement.

The rearward section of the safety pivot guard 40 contains the rim collar 51 extending from the rearward end of the expandable sleeve section 42 to the strut sleeve opening 52. The strut sleeve opening 52 is dimensioned to receive the forward ends of the strut members 34 and to retain the safety pivot guard 40 in positional integrity after the mounting of the safety pivot guard 40 over the strut members 34. In a preferred embodiment of the present invention the cross-sections of the strut sleeve opening 52 of the safety pivot guard 40 is essentially rectangular. The retention the rim collar 51 on the forward ends of the strut members 34 can be accomplished by friction fitting, adhesive bonding or by any other appropriate securing techniques.

While it is preferable that the safety pivot guard 40 be generally molded from an elastomeric material such as an opaque or transparent soft, pliable plastic or elastomeric polymer, it is desirable that the arm collar 50 containing the handle arm aperture 48 be thicker and more rigid in nature in order to maintain its structural integrity as torque is applied the arm collar 50 from pivoting action of the handle arm 30.

FIG. 4 displays a transparent safety pivot guard 40 in an operating position mounted over the pivot 32 connecting the wagon handle arm 30 and the strut members 34. The handle arm 30 of the wagon extends through the handle arm aperture 48 in the forward end of safety pivot guard 40 and the strut members 34 extend through the strut sleeve opening 52 in the rearward end of the safety pivot guard 40.

The safety pivot guard of the present invention is easily mountable on a coaster wagon during or after manufacture. The safety pivot guard can be mounted into position prior to attachment of the handle 38 onto the handle arm 30 simply by inserting the handle arm 30 of the coaster wagon sequentially through the strut sleeve opening 52 then the handle arm aperture 48 and sliding the safety pivot guard down the handle arm so that the accordion section 42 encompasses or envelopes the pivot 32 in the steering mechanism and rim collar 51 accepts the strut members 34 into the strut sleeve opening 52 in retentive engagement. The safety pivot guard of the present invention can be easily mounted onto an existing coaster wagon by removing the handle from the wagon handle arm, positioning the safety pivot guard according to the above procedure, and reattaching the handle.

It is apparent that the safety pivot guard of the present invention will completely encompass or envelope the wagon handle pivot without impairing the working of the pivot, and will remain in position throughout the working operation of the coaster wagon, thus preventing any accidents that may occur upon the exposure of the wagon handle pivot during its operation.

It is understood that modifications and variations in structure of the safety pivot guard of the present invention can be made without departing from the scope and novel concepts of the present invention.

I claim:

1. For use with a coaster wagon having a steering mechanism comprising a steering handle arm connected to strut members so as to pivot about a pivot axis by pivoting means, a safety pivot guard in engagement with the steering mechanism comprising an accordion sleeve section enveloping the pivoting means and being bendable about the pivot axis, the accordion sleeve section having at a forward end a hood surface having a centrally located collar apertured to retain the steering handle arm in a slidable fashion and at a rearward end having a rim collar having a strut sleeve opening dimensioned to receive the strut members in retentive engagement.

2. The safety pivot guard as defined in claim 1, wherein the accordion sleeve section is substantially rectangular in cross-section.

3. The safety pivot guard as defined in claim 1, wherein the centrally located collar is provided with an aperture dimensioned to the approximate cross-sectional area of the steering handle arm.

4. The safety pivot guard as defined in claim 1, wherein the accordion sleeve section comprises a plurality of pleats disposed in successive abutting fashion.

5. In combination: a coaster wagon comprising a steering handle arm pivotally attached by pivoting means to front struts extending forward from a front steering wheel and axle assembly so as to pivot around a pivot axis; and a safety pivot guard comprising a bellows of elastomeric material enveloping the pivoting means, a hood surface at a forward end from the bellows having a collar apertured to slidably retain the steering handle arm, and a rim collar extending rearwardly from the bellows having a strut sleeve opening dimensioned to receive the strut members in retentive engagement, the bellows being extendable as the steering handle arm pivots around the pivot axis.

* * * * *